(12) United States Patent
Ouchi

(10) Patent No.: US 7,808,701 B2
(45) Date of Patent: Oct. 5, 2010

(54) MICROSCOPE APPARATUS

(75) Inventor: Yumiko Ouchi, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/461,006

(22) Filed: Jul. 29, 2009

(65) Prior Publication Data

US 2009/0296205 A1   Dec. 3, 2009

Related U.S. Application Data

(63) Continuation of application No. PCT/JP2008/056883, filed on Apr. 7, 2008.

(30) Foreign Application Priority Data

Apr. 12, 2007   (JP) ............................. 2007-104725

(51) Int. Cl.
G02B 21/06 (2006.01)
G02B 21/00 (2006.01)

(52) U.S. Cl. ...................... 359/388; 359/368; 359/385
(58) Field of Classification Search .......... 359/368–390
See application file for complete search history.

(56) References Cited

U.S. PATENT DOCUMENTS

| 6,239,909 | B1 | 5/2001 | Hayashi et al. |
| 6,317,259 | B1* | 11/2001 | Matsui ........................ 359/371 |
| RE38,307 | E | 11/2003 | Gustafsson et al. |
| 7,170,696 | B2* | 1/2007 | Wolleschensky ............ 359/831 |
| 2004/0085544 | A1* | 5/2004 | De Groot .................... 356/497 |
| 2009/0268280 | A1* | 10/2009 | Osawa et al. ................ 359/363 |

FOREIGN PATENT DOCUMENTS

| JP | A-11-242189 | 9/1999 |
| JP | A-2002-196253 | 7/2002 |

OTHER PUBLICATIONS

Lukosz; "Optical Systems with Resolving Powers Exceeding the Classical Limit. II;" *Journal of the Optical Society of America*; 1967; pp. 932-941; vol. 57.

Lukosz et al.; "Optischen Abbildung unter Überschreitung der beugungsbedingten Auflösungsgrenze;" *Opt. Acta.*; 1963; pp. 241-255; vol. 10.

* cited by examiner

*Primary Examiner*—Thong Nguyen
(74) *Attorney, Agent, or Firm*—Oliff & Berridge PLC

(57) ABSTRACT

Diffracted light generated by a diffraction grating passes through a tube lens, reflected by a reflection mirror and forms illuminating light in a strip pattern on the surface of a sample. Thus, fluorescence generated by an objective lens from the sample passes through the objective lens, the reflection mirror and a tube lens, and forms an image of the sample on the diffraction grating. When the diffraction grating is removed from an optical system and a dichroic mirror is arranged, in instead of the reflection mirror, fluorescence from the sample passes through the dichroic mirror, and forms an image of the sample on an imaging surface of an imaging device by an imaging lens. Thus, a microscope which can be used by being switched from a normal fluorescent microscope and uses the diffracted light is provided.

9 Claims, 8 Drawing Sheets

0°

120°

240°

US 7,808,701 B2

MICROSCOPE APPARATUS

This is a Continuation of Application No. PCT/JP2008/056883 filed Apr. 7, 2008, which claims the benefit of Japanese Patent Application No. 2007-104725 filed Apr. 12, 2007. The disclosure of the prior applications is hereby incorporated by reference herein in its entirety.

FIELD OF THE INVENTION

The present invention relates to a microscope apparatus.

BACKGROUND OF THE INVENTION

A technique of spatially modulating illumination light can be cited as an example of a technique of performing super-resolution of an observation object such as a biological specimen. For example, the technique of spatially modulating illumination light is described in Japanese Patent Application Laid-Open No. 11-242189 (Patent Document 1), U.S. Reissued Patent No. 38307 (Patent Document 2), W. Lukosz, "Optical systems with resolving powers exceeding the classical limit. II", Journal of the Optical Society of America, Vol. 37, PP. 932, 1967 (Non-Patent Document 1), and W. Lukosz and M. Marchand, Opt. Acta. 10, 241, 1963 (Non-Patent Document 2).

In these techniques, a spatial frequency of a structure of the observation object is modulated with the spatially modulated illumination light, and information on the high spatial-frequency exceeding a resolution limit is caused to contribute to image formation of a microscope optical system. However, in order to observe a super-resolution image, it is necessary to demodulate a modulated image of the observation object (modulated image). The demodulation method is mainly fallen into optical demodulation (see Non-Patent Document 1 and 2) and computing demodulation (see Patent Documents 1 and 2). The optical demodulation is realized by re-modulation of the modulated image with a spatial modulation element such as a diffraction grating.

Patent Document 1: Japanese Patent Application Laid-Open No. 11-242189
Patent Document 2: U.S. Reissued Patent No. 38307
Non-Patent Document 1: W. Lukosz, "Optical systems with resolving powers exceeding the classical limit. II", Journal of the Optical Society of America, Vol. 37, PP. 932, 1967
Non-Patent Document 2: W. Lukosz and M. Marchand, Opt. Acta. 10, 241, 1963

However, the computing demodulation takes time because of complicated arithmetic processing, and the observation object is hardly observed in real time. On the other hand, the optical demodulation does not take much time because of the use of the spatial modulation element such as a diffraction grating. However, because demodulation accuracy depends on shape accuracy and arrangement accuracy of the spatial modulation element, a good super-resolution image is hardly obtained.

For example, in the demodulation method (optical demodulation) described in Non-Patent Document 2, an optical path for the modulation and an optical path for the demodulation are provided in parallel, and different portions of the common diffraction grating are used in the modulation and the demodulation, thereby improving the problem of the arrangement accuracy. However, there exits a problem that a pupil of the optical system relating to the modulation and a pupil of the optical system relating to the demodulation cannot be conjugated, and therefore an observation field is extremely narrowed.

There is also a demand that both super-resolution observation and normal, simple fluorescence observation are performed without rearranging the observation object in microscopes.

In view of the foregoing, the problem to be solved by the invention is to provide a super-resolution microscope apparatus that can be switched to a normal fluorescence microscope.

SUMMARY OF THE INVENTION

A first aspect of the invention provides a microscope apparatus including a spatial modulator that receives an irradiation light beam to form diffracted light beams; an objective optical system that causes the diffracted light beams to interfere with each other on a sample to form an interference fringe, the objective optical system forming an image of the sample being modulated by the interference fringe on the spatial modulator surface; image pickup means; and a relay optical system that forms an image of the sample being re-modulated by the spatial modulator surface on an image plane of the image pickup means, wherein light separation means and a reflecting member are disposed in the objective optical system while being able to be selectively inserted in and detached from an optical path, and a direction in which the light from the sample travels with the light separation means inserted in the optical path differs from a direction in which the light from the sample travels with the reflecting member inserted in the optical path.

A second aspect of the invention provides a microscope apparatus including a spatial modulator that receives an irradiation light beam to form diffracted light beams; an objective optical system that causes the diffracted light beams to interfere with each other on a sample to form an interference fringe, the objective optical system forming an image of the sample being modulated by the interference fringe on the spatial modulator surface; image pickup means; and a relay optical system that forms the sample being re-modulated by the spatial modulator surface on an image plane of the image pickup means, wherein the spatial modulator is disposed while being able to be inserted in and detached from an optical path, and light separation means and a reflecting member are disposed in the objective optical system while being able to be selectively inserted in and detached from the optical path, the spatial modulator is removed from the optical path when the light separation means is inserted in the optical path, and the spatial modulator is inserted in the optical path when the reflecting member is inserted in the optical path.

In accordance with a third aspect of the invention, in the microscope apparatus according to the first or second aspect, the light from the sample forms an image on the spatial modulator surface when the reflecting member is inserted in the optical path, and the light from the sample forms an image on an image plane of another image pickup means that is different from the image pickup means through another relay optical system that is different from the relay optical system when the light separation means is inserted in the optical path.

In accordance with a fourth aspect of the invention, in the microscope apparatus according to any one of the first to third aspects, the reflecting member is a reflecting mirror whose thickness is larger than 1.5 mm.

In accordance with a fifth aspect of the invention, in the microscope apparatus according to any one of the first to third aspects, the reflecting member is a reflecting prism.

A sixth aspect of the invention provides microscope apparatus including a spatial modulator that receives an irradiation light beam to form a diffracted light beam; an objective optical system that causes the diffracted light beams to interfere with each other on a sample to form an interference fringe, the objective optical system forming an image of the sample being modulated by the interference fringe on the spatial modulator surface; image pickup means; and a relay optical system that forms an image of the sample being re-modulated by the spatial modulator surface on an image plane of the image pickup means, wherein the spatial modulator is placed while being able to be inserted and detached.

Accordingly, the invention can provide the super-resolution microscope apparatus that can be switched to the normal fluorescence microscope.

Figure 1:
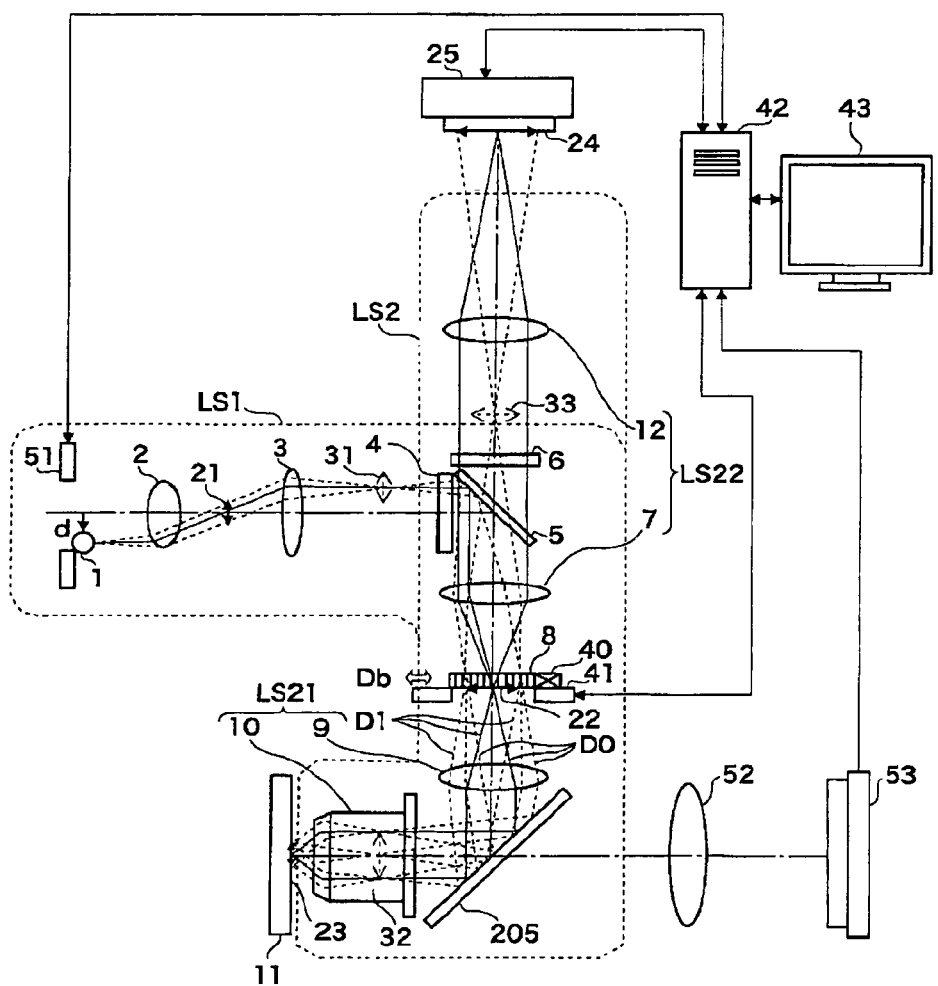
FIG. 1 is a view showing an outline of an optical system of a microscope apparatus according to a first mode of operation of the invention.

EXPLANATIONS OF LETTERS OR NUMERALS 1 light source
2 collector lens
3 lens
4 exciter filter
5 dichroic mirror
6 barrier filter
7 lens
8 diffraction grating
9 tube lens
10 objective lens
11 specimen
12 lens
21 pupil
22 conjugate plane of specimen 11
23 image of diffraction grating 8
24 magnified image of re-modulated image
25 image pickup device
31 light source image
32 pupil plane
40 actuator
41 rotating stage
42 computer
43 image display device
51 rotating stage
52 imaging lens
53 image pickup device
54 specimen surface image
201 exciter filter
202 dichroic mirror
203 barrier filter
204 block
205 reflecting mirror
206 block
LS1 illumination optical system
LS2 observation optical system
LS21 objective optical system
LS22 relay optical system

DESCRIPTION OF THE PREFERRED EMBODIMENTS

Figure 2:
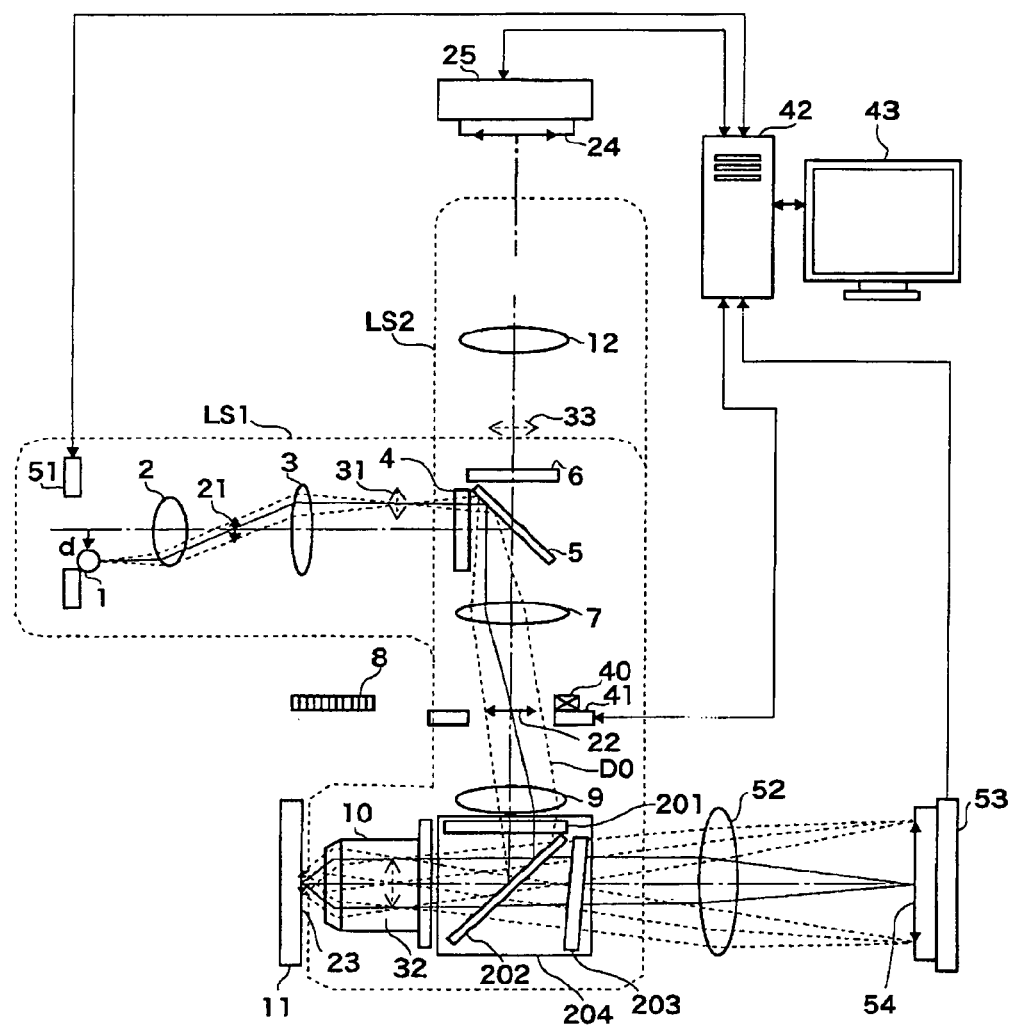
FIG. 2 is a view showing an outline of an optical system of a microscope apparatus according to a second mode of operation of the invention.

An exemplary embodiment of the invention will be described with reference to the drawings. FIGS. 1 and 2 are views showing an outline of an optical system of a microscope apparatus according to an embodiment of the invention. FIG. 1 shows a light beam in cases where the microscope apparatus is used as a super-resolution microscope in which a spatially modulated illumination light beam is utilized.

As shown in FIG. 1, a light source 1 that is disposed on a rotating stage 51, a collector lens 2, a lens 3, an exciter filter 4, a dichroic mirror 5, a lens 7, a diffraction grating 8, a tube lens 9, a reflecting mirror 205, an objective lens 10, a specimen (such as a biological specimen) 11 that is labeled by fluorescent dye, a barrier filter 6, lens 12, an image pickup device 25 (such as a CCD camera), a computer 42 (such as a circuit and a computer), an image display device 43, an actuator 40, and a rotating stage 41 are disposed in the microscope apparatus. An imaging lens 52 and an image pickup device 53 are also disposed. The imaging lens 52 and the image pickup device 53 are utilized when the microscope apparatus is used as the fluorescence microscope.

Among these, the light source 1, the collector lens 2, the lens 3, the exciter filter 4, the dichroic mirror 5, the lens 7, the diffraction grating 8, the tube lens 9, the reflecting mirror 205, and the objective lens 10 constitute an illumination optical system LS1. The objective lens 10, the reflecting mirror 205, the tube lens 9, the diffraction grating 8, the lens 7, the dichroic mirror 5, the barrier filter 6, and the lens 12 constitute an observation optical system LS2. The objective lens 10, the reflecting mirror 205, and the tube lens 9 constitute an objective optical system LS21, and the lens 7 and the lens 12 constitute a relay optical system LS22. An optical path from the objective lens 10 to the dichroic mirror 5 is shared by the illumination optical system LS1 and the observation optical system LS2.

The light source 1 of the illumination optical system LS1 is disposed at a position where the light source 1 is decentered from an optical axis by a predetermined distance d. The collector lens 2 converts the light beam emitted from the light source 1 into a parallel light beam, and the lens 3 forms a light source image 31 on a pupil conjugate plane. After the exciter filter 4 selects a wavelength of the light beam from the light source image 31, the dichroic mirror 5 deflects the light beam. Then the light beam enters a common optical path of the illumination optical system LS1 and the observation optical system LS2, and the lens 7 collects the light beam onto a conjugate plane 22 of the specimen 11. The diffraction grating 8 disposed in the conjugate plane 22 generates a 0th-order light beam and a 1st-order light beam. The 0th-order light beam goes directly straight. The diffraction grating 8 is arranged such that the 1st-order light beam and the 0th-order light beam are symmetrical with respect to the optical axis. Fluxes of the 0th-order light beam and the 1st-order light beam are incident to the tube lens 9, and the tube lens 9 converts the light beams into the parallel light beams. Then the parallel light beams are deflected at right angle by the reflecting mirror 205, and form a two-beam interference fringe on the specimen 11 through the objective lens 10 (at this point, a light source image 32 is formed in a focal plane on the rear side of the objective lens 10). Therefore, the specimen 11 is illuminated by the spatially modulated illumination light beam (structured illumination). In FIG. 1, the numeral 21 designates a pupil.

For example, the diffraction grating 8 is a phase type or amplifying type diffraction grating having a one-dimensional periodic structure. In particular, because the amplifying type diffraction grating has a good wavelength property, a white light source can preferably be used as the light source 1. Instead of the white light source, a light source having a single wavelength may be used as the light source 1. A light beam emitted from a laser light source is guided through an optical fiber, and a secondary light source formed at an end face of the optical fiber may be used as the light source 1.

Desirably excessive diffraction components of 2nd-order or more, generated in the diffraction grating 8, are removed in order that an intensity distribution (intensity distribution of an image 23 of the diffraction grating 8) of the structured illumination is formed into a sine wave shape. At this point, the excessive diffraction components may be removed at a proper point (such as a pupil plane of the objective lens 10) behind the diffraction grating 8. Alternatively, when a concentration distribution of the diffraction grating 8 is previously formed into the sine wave shape, the generation of the excessive diffraction components can be restrained to prevent a loss of light quantity.

In the embodiment, the light source 1 is previously decentered such that a 0th-order light beam (that is not diffracted but goes straight ahead) D0 and a 1st-order light beam D1 become symmetrical in relation to the optical axis of the objective lens among the diffracted light beams generated by the diffraction grating 8. An amount d by which the light source 1 is decentered can be obtained by computation using a pitch of the diffraction grating 8 and a combined focal distance of the collector lens 2, the lens 3, and the lens 7.

The amount d by which the light source 1 is decentered is expressed by $$d = f22 \times \lambda / (2 \times Pg) \quad (1)$$

where Pg is the pitch of the diffraction grating, $\lambda$ is a wavelength of the light source, and f22 is the combined focal distance of the collector lens 2, the lens 3, and the lens 7.

The 0th-order light beam D0 and the 1st-order light beam D1 are collected on the pupil plane 32 of the objective lens 10. Desirably high super-resolution effect is obtained when the focal points of the 0th-order light beam D0 and the 1st-order light beam D1 are set at an end of a pupil diameter (at a position as far from the optical axis as possible) of the objective lens 10. In such cases, among the light beams diffracted by the diffraction grating 8, the light beams except for the 0th-order light beam and the 1st-order light beam have no influence on the subsequent system because the light beams cannot be incident to a position within an effective diameter of the objective lens 10. The 0th-order light beam D0 and the 1st-order light beam D1, which are collected on the pupil plane 32, leave the objective lens 10 while each of the 0th-order light beam D0 and the 1st-order light beam D1 becomes a parallel light flux, and form a two-beam interference fringe on the specimen 11.

As a result, fluorescence is generated on the specimen 11 with the structured illumination light as an excitation light. At this point, the structure of the specimen 11 is modulated by the structured illumination when viewed from the side of the objective lens 10. A moire fringe is generated in the modulated structure. The moire fringe is formed by a fine structure of the specimen 11 and a structured illumination pattern, and the fine structure of the specimen 11 is converted into a spatial frequency band that is lower by a spatial frequency of the structured illumination. Therefore, a light beam of the structure of the spatial frequency that is higher than the resolution limit is also captured by the objective lens 10.

The fluorescent light beam captured by the objective lens 10 forms a modulated image of the specimen 11 on the conjugate plane 22 by the objective optical system LS21 including the objective lens 10, the reflecting mirror 205, and the tube lens 9. The modulated image is re-modulated by the diffraction grating 8 disposed in the conjugate plane 22. In the generated re-modulated image, the structure of the specimen 11 in which the spatial frequency is changed is returned to the original spatial frequency. The re-modulated image includes a demodulated image of the specimen 11.

However, the re-modulated image includes diffraction components that are unnecessary for the demodulated image. The unnecessary diffraction components include ±1st-order diffraction components that are generated for the 1th-order light beam outgoing from the specimen 11 by the diffraction grating 8, a 0th-order diffraction component for a 1st-order light beam outgoing from the specimen 11, and a 0th-order diffraction component for a +1st-order light beam outgoing from the specimen 11. In order to remove the unnecessary diffraction components from the re-modulated image, it is necessary that the diffraction grating 8 be moved in one period or N periods (N is a natural number) to perform averaging.

The fluorescent light beam from the re-modulated image is transmitted by the dichroic mirror 5 through the lens 7, and the fluorescent light beam enters a single optical path of the observation optical system LS2. The fluorescent light beam is transmitted by the barrier filter 6 to form a magnified image 24 of the re-modulated image through the lens 12. That is, the re-modulated image re-modulated by the diffraction grating 8 is relayed to the magnified image 24 by the relay optical system LS22 including the lens 7 and the lens 12. The magnified image 24 is taken by the image pickup device 25 to generate image data of the re-modulated image. In cases where the image is taken by the image pickup device 25, the image data of the re-modulated image can be obtained, when the averaging is performed by integrating the re-modulated image while the diffraction grating 8 is moved in one period or N periods (N is a natural number).

The image data includes information used to perform the super-resolution observation of the specimen 11 with the structured illumination: The computer 42 captures the image data and performs the computation. Then the image data is transmitted to the image display device 43.

As described above, in the microscope apparatus, the optical path from the conjugate plane 22 of the specimen 11 to the specimen 11 is completely shared by the illumination optical system LS1 and the observation optical system LS2, and the diffraction grating 8 is disposed in the conjugate plane 22. In the microscope apparatus, the fine structure of the specimen 11 is modulated by the diffraction grating 8. The modulated fine structure of the specimen 11 is automatically re-modulated by the diffraction grating 8 disposed in the conjugate plane 22.

The actuator 40 can move the diffraction grating 8 in a direction Db orthogonal to a grid line. The movement of the diffraction grating 8 changes a phase of the structured illumination. The computer 42 controls the actuator 40 and the image pickup device 25 such that the phase of the structured illumination is changed by one period or N periods (N is a natural number) while one-frame image data is integrated, whereby the structured illumination pattern and the unnecessary diffraction components generated during the re-modulation are eliminated from the image data.

Alternatively, a charge accumulation type image pickup element such as CCD is used as the image pickup element of the image pickup device 25, and a time necessary for the phase of the structured illumination to be changed by one period or N periods (N is a natural number) is set at an accumulation time, whereby the structured illumination pattern and the unnecessary diffraction components generated during the re-modulation may be eliminated from the image data.

Alternatively, an image pickup element, such as NMOS and CMOS, which is not the charge accumulation type is used as the image pickup element of the image pickup device 25, and a low-pass filter or an integrating circuit is connected to an output of each pixel, whereby the structured illumination pattern and the unnecessary diffraction components generated during the re-modulation may be eliminated from the image data. At this point, a time constant of the connected low-pass filter or integrating circuit is set to at least a time necessary for the phase of the structured illumination to be changed by one period or N periods (N is a natural number).

The rotating stage 41 can rotate the diffraction grating 8 and the actuator 40 about the optical axis. The rotation changes the structured illumination direction. The computer 42 controls the rotating stage 41 and the image pickup device 25 to obtain the image data every time the structured illumination direction is changed to plural directions, which allows information for the super-resolution observation to be obtained in the plural directions. Therefore, the two-dimensional super-resolution observation of the specimen 11 can be performed.

A program necessary for the above-described operations is previously installed in the computer 42 through a recording medium such as CD-ROM and the Internet.

When the rotating stage 41 rotates the diffraction grating 8 about the optical axis, it is necessary that the direction in which the light source 1 is decentered be rotated with respect to the optical axis. The rotating stage 51 is an example of the means for rotating the direction in which the light source 1 is decentered, and Japanese Patent Application No. 2006-334211 discloses the detailed means.

The diffraction grating 8 having the one-dimensional periodic structure and the actuator 40 that moves the diffraction grating 8 in one direction (direction orthogonal to the grid line) are used in the embodiment. When a diffraction grating having a two-dimensional periodic structure and an actuator that moves the diffraction grating in two directions (directions orthogonal to the grid line) are used, pieces of information on the super-resolution image in the two directions are substantially simultaneously obtained, so that speed enhancement can further be achieved.

In the microscope apparatus of the embodiment, the image pickup device 25 detects the relayed re-modulated image (magnified image 24). Alternatively, in a variant the magnified image 24 may be observed by the naked eye through an eyepiece lens.

In the microscope apparatus of the embodiment, the diffraction grating is used as the spatial modulator. Alternatively, another spatial modulator that similarly acts on the incident light flux may be used. For example, when a spatial modulator such as a transmission type liquid crystal display element is used instead of the diffraction grating 8, the phase and direction of the structured illumination can be electrically changed, so that the speed enhancement can further be achieved without the use of the actuator or rotating stage.

FIG. 2 shows a light beam in cases where the microscope apparatus is used as a normal fluorescent microscope. In the following drawings, the same component as the component shown in the previous drawings is designated by the same numeral, and sometimes the description will not be repeated. When the microscope apparatus of FIG. 1 is compared to the microscope apparatus of FIG. 2, in FIG. 2, the reflecting mirror 205 that is of the reflecting member is removed from the optical path, and instead a block 204 is inserted in the optical path. The block 204 contains an exciter filter 201 that selects the waveform of the illumination light beam, a dichroic mirror 202 that is of the illumination light beam/image forming light beam separation means, and a barrier filter 203. The diffraction grating 8 is detached from the optical path.

Therefore, the illumination light beam emitted from the light source 1 follows the same optical path as that of FIG. 1 to the position at which the diffraction grating 8 is used to be. However, the illumination light beam continues down the optical path without the influence of the diffraction grating 8, the illumination light beam is transmitted by the tube lens 9 and the exciter filter 201, and the illumination light beam is reflected by the dichroic mirror 202. Then the objective lens 10 performs Kohler illumination to the surface of the specimen 11 with the illumination light beam.

The fluorescent light beam generated from the surface of the specimen 11 by the illumination light beam is transmitted by the dichroic mirror 202 through the objective lens 10, and the fluorescent light beam is transmitted by the barrier filter 203. Then an image 54 of the surface of the specimen 11 is formed on the image plane of the image pickup device 53 through the imaging lens 52. That is, the microscope apparatus can be used as the normal fluorescence microscope.

As shown in FIGS. 1 and 2, functions can be switched between the super-resolution microscope apparatus in which the diffracted light beam is utilized and the normal fluorescence microscope only by replacing the reflecting mirror 205 that is of the reflecting member with the dichroic mirror 202 that is of the illumination light beam/image forming light beam separation means and vice versa and by inserting and detaching the diffraction grating 8 in and from the optical path.

Figure 3:
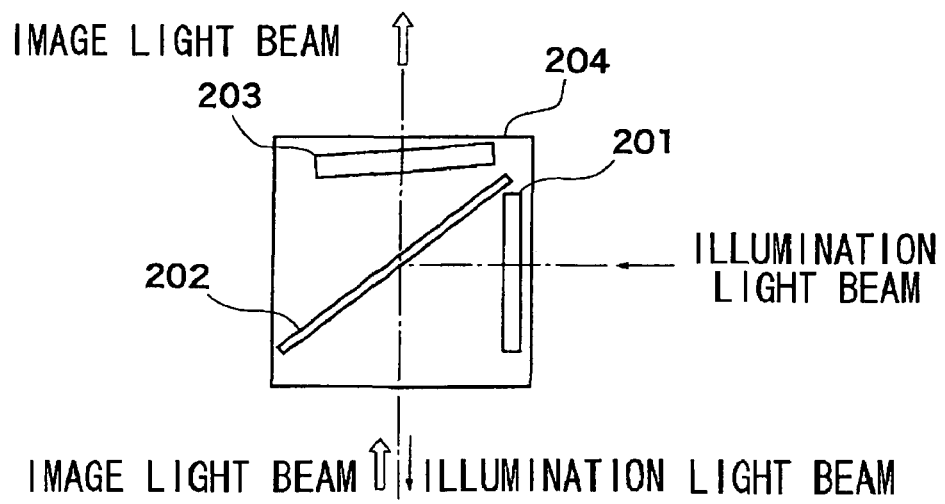
FIG. 3 is a view showing an outline of illumination light beam/image forming light beam separation means.

FIG. 3 shows an outline of the illumination light beam/image forming light beam separation means. In the illumination light beam/image forming light beam separation means, the exciter filter 201 that selects the wavelength of the illumination light beam, the dichroic mirror 202, and the barrier filter 203 are contained in one block 204. The block 204 is selected and inserted in the optical path by a turret (not shown).

Figure 4:
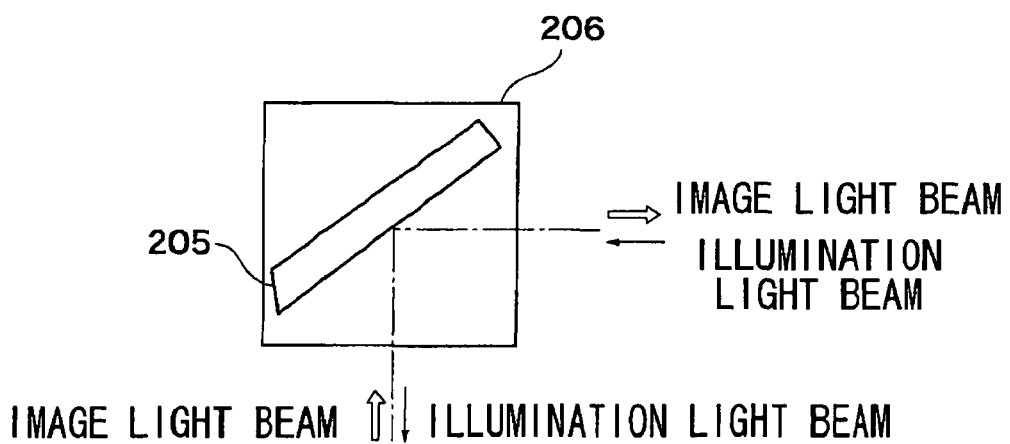
FIG. 4 is a view showing a block used in cases where a microscope apparatus is used as a super-resolution microscope in which spatially-modulated illumination light beam is utilized.

FIG. 4 shows a block 206 used in cases where the microscope apparatus is used as the super-resolution microscope in which the spatially-modulated illumination light beam is utilized. The exciter filter and the barrier filter are eliminated, and the reflecting mirror 205 is contained instead of the dichroic mirror. When the block 206 is inserted in the optical path, 100% of the structured illumination light beam is reflected to illuminate the specimen, and 100% of the modulated fluorescent light beam from the specimen is also reflected to go to the illumination device (and does not go to the observation unit of the normal fluorescence microscope). As described above, the fluorescent light beam is re-modulated by the spatial modulator, time integration data of the image is obtained by the image pickup device, and the super-resolution image is obtained.

Accordingly, the fluorescent light beam of the specimen can be introduced to the observation unit of the normal fluorescence microscope when the block 204 is inserted into the optical path, and the image re-modulated by the spatial modulator 8 can be introduced to the image pickup device 25 when the block 204 is switched to the block 206.

In the microscope apparatus, when the reflecting mirror 205 is designed into the same shape as the dichroic mirror 202 and the specification of the evaporated film is changed from that for the dichroic mirror to that for the reflecting mirror, advantageously a substrate glass and holding hardware can commonly be used to reduce costs. However, from the following consideration, it is found that a thickness of the reflecting mirror 205 is desirably larger than that of the dichroic mirror 202.

In the normal microscope, the shape of the dichroic mirror 202 has a thickness of about 1 mm and an outer diameter of about 25 mm×about 35 mm. This is because a space is saved to realize wide visual field observation. However, because the dichroic mirror 202 is thin compared with the outer diameter, particularly a distortion is easy to generate in a longer diameter. In cases where the dichroic mirror is distorted, for the reflection optical path, only the reflecting surface of the dichroic mirror is influenced. Since the longer diameter differs from the shorter diameter in an optical power given to the incident light flux, astigmatism is generated in image forming performance after the reflection. On the other hand, for the transmission optical path, because the incident light flux is transmitted by both the reflecting surface and the backside of the dichroic mirror, the image forming performance is hardly influenced when the reflecting surface and the backside are distorted. Further, usually the high image forming performance is not required for the illumination light beam, and therefore there is generated no problem even if the astigmatism is generated by the distorted dichroic mirror.

However, in the case of the microscope apparatus, the high image forming performance is required because the fringe pattern is projected in the illumination optical system. Additionally, because the image forming light beam from the specimen is also reflected by the reflecting mirror, it is necessary to avoid deterioration of the image forming performance, which is caused by the distortion. Therefore, in the embodiment, the substrate of the dichroic mirror is thickened to prevent the distortion.

The reflecting mirror 205 is used for the super-resolution microscope in which the spatially modulated illumination light beam is utilized. In such cases, as described above, the high image forming performance is required because the fringe pattern is projected in the illumination optical system. Further, it is necessary to avoid deterioration of the image forming performance, which is caused by the distortion, because the image forming light beam from the specimen is also reflected by the reflecting mirror 205. For these reasons, preferably the thickness of the reflecting mirror 205 is larger than that of the normal dichroic mirror 202 and the thickness of the reflecting mirror 205 is larger than 1.5 mm. Alternatively, preferably the reflecting prism is used instead of the reflecting mirror.

Figure 5A:
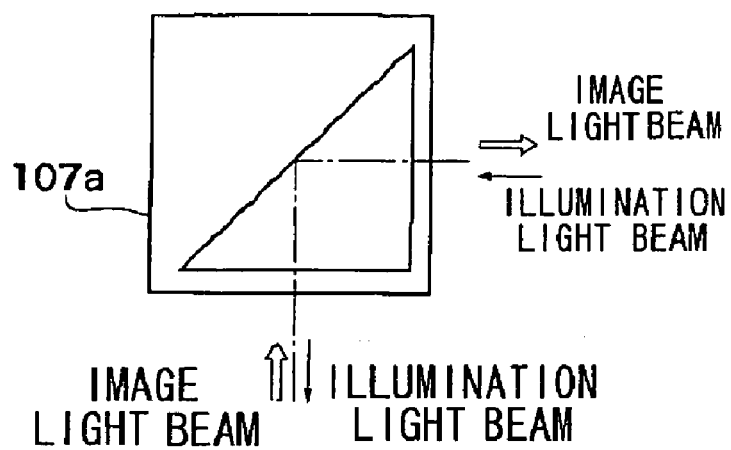
FIG. 5A is a view showing a first block in which a reflecting prism is disposed instead of a mirror.
Figure 5B:
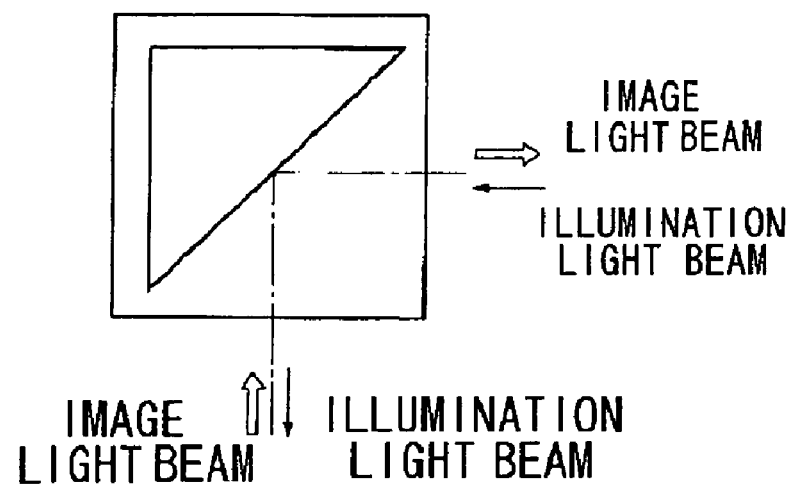
FIG. 5B is a view showing a second block in which a reflecting prism is disposed instead of a mirror.

FIGS. 5A and 5B show blocks in which the reflecting prisms are disposed instead of the mirrors. FIG. 5A shows an example of a total reflection prism in which an inclined surface is not evaporated, and FIG. 5B shows an example of a configuration in which an inclined surface is evaporated to prevent the light flux from entering the inside of the prism. In the example of FIG. 5A, a reflectance can be increased while sometimes reflected light beams at the incident surface and outgoing surface of the prism become a noise. Therefore, preferably the configuration of FIG. 5B is adopted.

Figure 6:
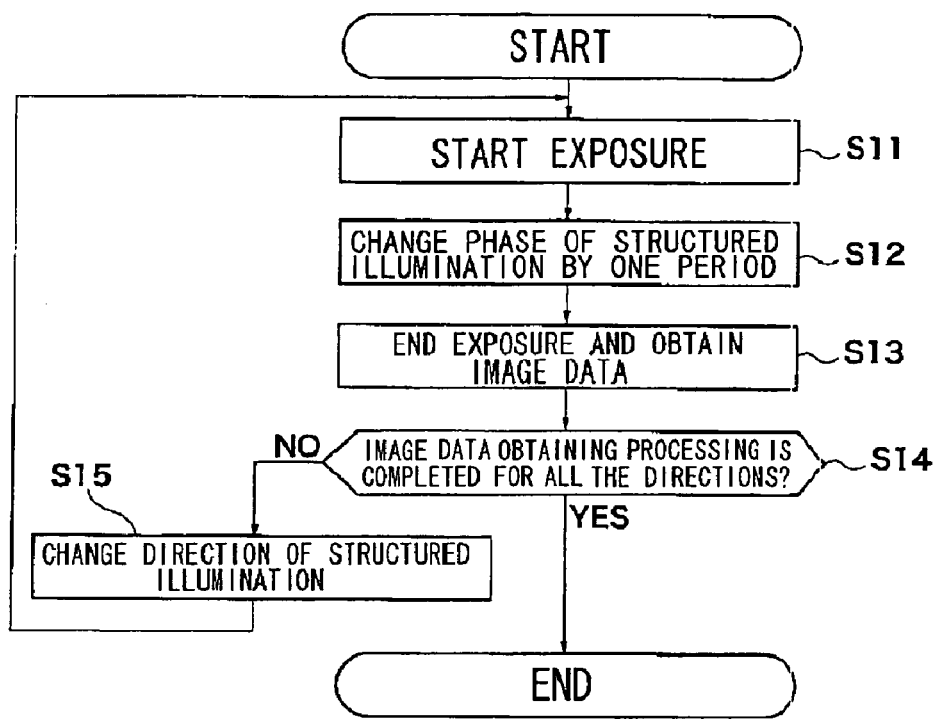
FIG. 6 is an operation flowchart relating to control of a computer.

Operations relating to control of the computer 42 of FIG. 1 will be described below. FIG. 6 is an operation flowchart relating to the control of the computer 42. As shown in FIG. 6, when obtaining the image data of the re-modulated image, the computer 42 changes the phase of the structured illumination by one period (Step S12) in a term from exposure start (Step S11) of the image pickup device 25 to exposure end (Step S13).

The obtained image data is the time integration of the re-modulated image in changing the phase of the structured illumination, and a luminance distribution of the structured illumination has a sine wave shape, so that the structured illumination pattern can be eliminated from the image data. The unnecessary diffraction component generated during the re-modulation is also eliminated from the image data. Therefore, the image data expresses the demodulated image. Other methods except for the above-described method can be adopted in for the elimination.

Further, after the computer 42 changes the direction of the structured illumination (Step S15), the computer 42 performs the pieces of processing in Steps S11 to S13 again to obtain image data of another demodulated image in which the structured illumination pattern is eliminated.

The pieces of processing for obtaining the image data of the demodulated image in Steps S11 to S13 are repeated until the direction of the structured illumination is set to all the predetermined directions (until the decision in Step S14 becomes affirmative), and the pieces of image data of the demodulated image of the number equal to that of the set directions are obtained. In the demodulated image the structured illumination pattern is eliminated.

For example, the computer 42 repeatedly performs the pieces of processing in Steps S11 to S13 until the directions of the structured illumination are set to three directions of 0°, 120°, and 240°, and the computer 42 obtains pieces of image data $I_1$, $I_2$, and $I_3$ of the three demodulated images in which the structured illumination patterns are eliminated. In the pieces of image data $I_1$, $I_2$, and $I_3$ of the demodulated images, the super-resolution directions differ from one another by 120°.

Figure 7:
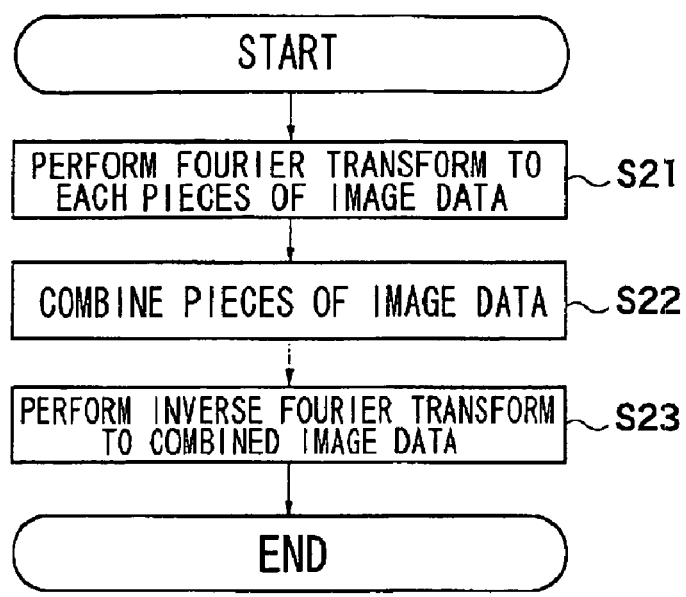
FIG. 7 is an operation flowchart relating to computation of the computer.

FIG. 7 is an operation flowchart relating to computation of the computer 42. At this point, the computation in cases where the pieces of image data $I_1$, $I_2$, and $I_3$ of the three demodulated images whose super-resolution directions differ from one another by 120° are obtained will be described.

Figure 8A:
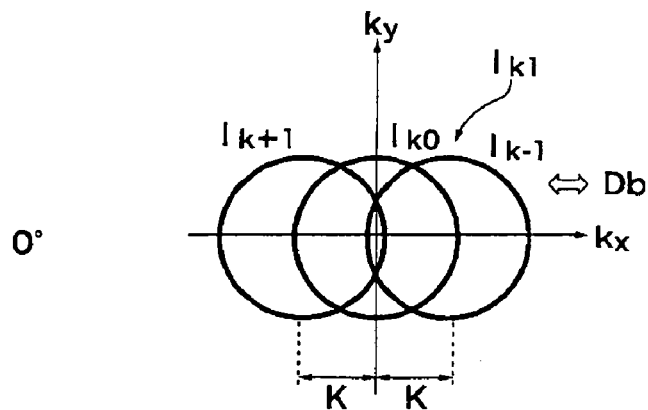
FIG. 8A is a view showing image data of a first demodulated image.
Figure 8B:
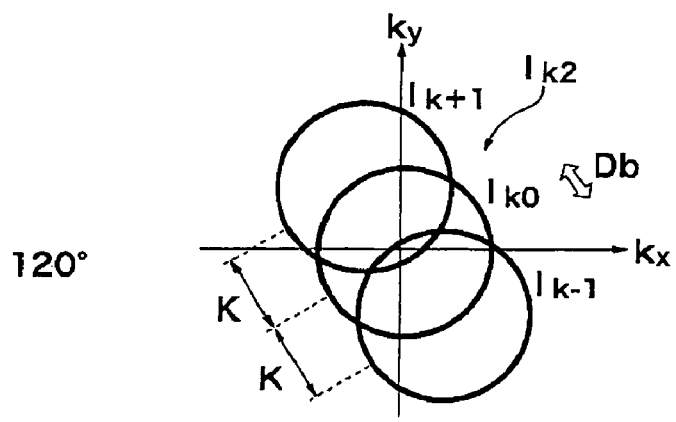
FIG. 8B is a view showing image data of a second demodulated image.
Figure 8C:
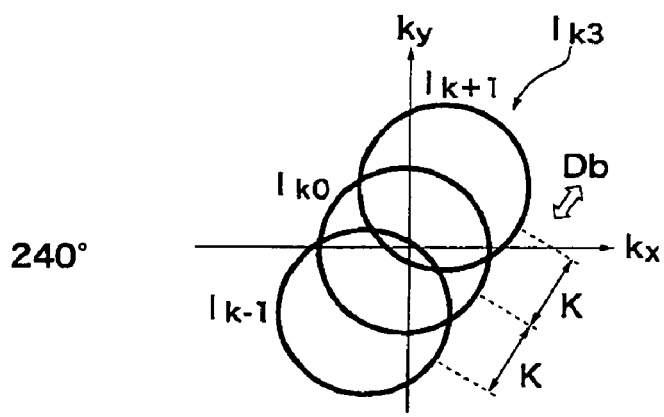
FIG. 8C is a view showing image data of a third demodulated image.

The computer 42 performs Fourier transform to each of the pieces of image data $I_1$, $I_2$, and $I_3$ of the three demodulated images to obtain pieces of image data $I_{k1}$, $I_{k2}$, and $I_{k3}$, which are expressed in Fourier space (Step S21). FIGS. 8A, 8B, and 8C show the pieces of image data $I_{k1}$, $I_{k2}$, and $I_{k3}$ of the demodulated images.

In FIGS. 8A, 8B, and 8C, the numerals $I_{k+1}$ and $I_{k-1}$ designate components (±1st-order modulated component) that are transmitted in the modulated state (as ±1st-order light beam) by the objective optical system LS21, and the numeral $I_{k0}$ designates a component (0th-order modulated component) that is transmitted in the non-modulated state (as 0th-order light beam) by the objective optical system LS21. Each circle indicates a region where MTF (Modulation Transfer Function) is not zero. The letter Db designates the super-resolution direction (structured illumination direction), and the letter K designates the spatial frequency of the structured illumination.

Figure 9:
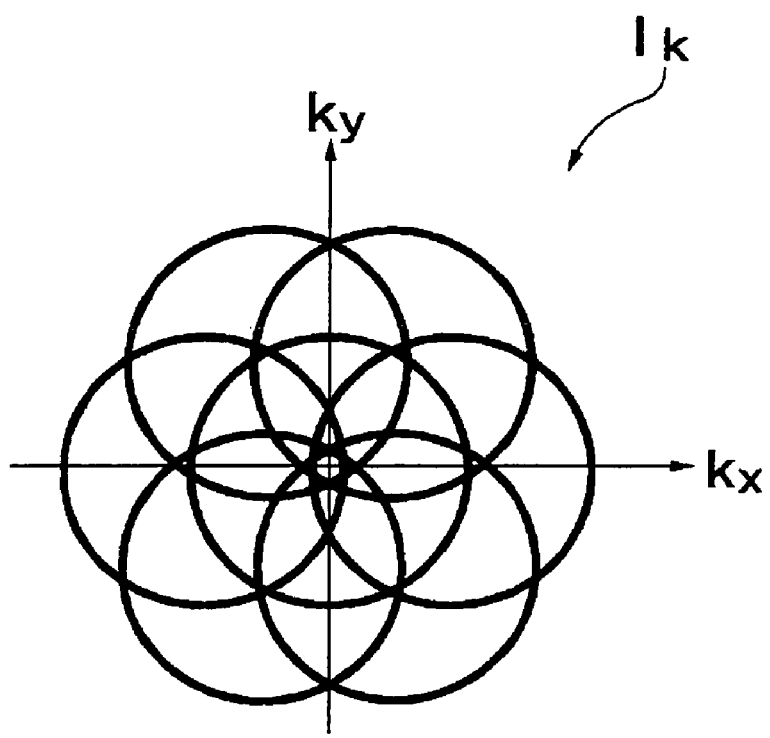
FIG. 9 is a view showing a state in which pieces of image data of three demodulated images are combined on Fourier space to obtain one combined image data.

Then the computer 42 combines the pieces of image data $I_{k1}$, $I_{k2}$, and $I_{k3}$ of the three demodulated images in the Fourier space as shown in FIG. 9, thereby obtaining the one combined image data $I_k$ (Step S22). Although the computation may be performed by simple addition, desirably the computation is performed by deconvolution processing in consideration of MTF. A technique in which a Wiener filter is used can be cited as an example of the deconvolution processing. At this point, the combined image data $I_k$ is computed as a function of a frequency f as shown below.

$$I_k(f) = \frac{\sum_j I_{kj}(f) \times MTF_j^*(f)}{\sum_j |MTF_j(f)|^2 + C} \quad (2)$$

In Equation (2), j is a direction of the diffraction grating 8 (0°, 120°, and 240°), and $MTF_j(f)$ is an effective MTF after the demodulation in each direction of the diffraction grating. The $MTF_j(f)$ is expressed by the following Equation (3) using NTF(f) of the objective optical system where $G_0$ and $G_1$ are 0th-order diffraction efficiency and 1st-order diffraction efficiency of the diffraction grating and $f_j$ is a frequency modulated by the diffraction grating. The sign * of $MTF*j(f)$ indicates that MTF is a complex number.

$$MTF_j(f) = (G_0 + 2G_1)MTF(f) + \sqrt{G_0 G_1}\, MTF(f + f_j) + \sqrt{G_0 G_1}\, MTF(f - f_j) \quad (3)$$

In Equation (3), $I_{kj}(f)$ is signal intensity of the j-th image at a spatial frequency f and C is a constant determined from a noise power spectrum.

A contribution of the low frequency component of the combined image data $I_k$ is prevented from being excessively increased through the processing, so that a contribution of the high frequency component can be prevented from being relatively decreased.

Then the computer 42 performs inverse Fourier transform to the combined image data $I_k$ to obtain image data I that is expressed in a real space. The image data I expresses the super-resolution images of the specimen 11 in the three directions whose angles differ from one another by 120° (Step S23). The computer 42 transmits the image data I to the image display device 43 to display the super-resolution images.

In the microscope apparatus of the embodiment, the light beam from the specimen 11 is re-modulated by the diffraction grating 8, and the diffraction grating 8 is moved to perform the averaging, whereby the unnecessary diffraction components are removed to obtain the demodulated image. Accordingly, because the demodulation computation is not performed, the image data of the demodulated image is obtained in a shorter time.

Additionally, because the same region of the same diffraction grating 8 is used in the modulation and the re-modulation, the modulation pattern and the re-modulation pattern can be matched with each other even if a shape error, a placement error, and a rotation angle error of the diffraction grating 8 are present. Accordingly, the shape error, the placement error, and the rotation angle error of the diffraction grating 8 hardly give the noise to the image data of the demodulated image. The same holds true for the change in phase of the structured illumination and the change in direction of the structured illumination. Accordingly, in the microscope apparatus, the super-resolution image is obtained with higher accuracy.

In the microscope apparatus, the deconvolution is performed in combining the plural pieces of image data (Steps S22 of FIG. 7), so that the good super-resolution image with little attenuation of the high frequency component can be obtained.

In the embodiments, the fluorescence microscope is described by way of example. However, the invention is not limited to the fluorescence microscope, but the invention can also be applied to a reflection microscope. In such cases, not the dichroic mirror but a half mirror is used as the light beam dispersion means. Illumination can be switched between the reflected illumination and the structured illumination by switching the reflecting member to the half mirror and vice versa.

The microscope apparatus of FIG. 1 may be changed to a microscope apparatus having the configuration, in which the imaging lens 52 and the image pickup device 53 do not exist, the switching mechanism between the reflecting mirror 205 and the dichroic mirror 202 does not exist, and the reflecting mirror 205 alone is stationarily disposed, and having a mechanism in which the diffraction grating 8 can be inserted in and detached from the optical system.

That is, in the case of the super-resolution observation, the structured illumination of the specimen 11 is performed using the illumination optical system LS1 in the state in which the diffraction grating 8 is inserted, and an image of the fluorescent light beam generated from the specimen 11 is formed on the image pickup device 25 through the diffraction grating 8 using the observation optical system LS2. On the other hand, in the case of the normal fluorescence observation, the Kohler illumination of the specimen 11 is performed using the illumination optical system LS1 in the state in which the diffraction grating 8 is not inserted, and an image of the fluorescent light beam generated from the specimen 11 is formed on the image pickup device 25 using the observation optical system LS2.

The invention claimed is:

1. A microscope apparatus comprising:
   a spatial modulator that receives an irradiation light beam to form diffracted light beams in a first mode;
   an objective optical system that, in the first mode, causes the diffracted light beams to interfere with each other on a sample to form an interference fringe, the objective optical system forming an image of the sample being modulated by the interference fringe on a surface of the spatial modulator;
   a first image pickup means; and
   a first relay optical system that forms an image of the sample being re-modulated by the surface of the spatial modulator on an image plane of the first image pickup means,
   wherein, in a second mode, a light separation means and, in the first mode, a reflecting member is disposed in the objective optical system, each being able to be selectively inserted in and removed from an optical path, and
   a direction in which a light from the sample travels in the second mode with the light separation means inserted in the optical path differs from a direction in which light from the sample travels in the first mode with the reflecting member inserted in the optical path.

2. The microscope apparatus according to claim 1, wherein, in the first mode, the light from the sample forms an image on the surface of the spatial modulator when the reflecting member is inserted in the optical path, and in the second mode, the spatial modulator is removed from the optical path, and the light from the sample forms an image on an image plane of a second image pickup means that is different from the first image pickup means through a second relay optical system that is different from the first relay optical system when the light separation means is inserted in the optical path.

3. The microscope apparatus according to claim 1, wherein the reflecting member is a reflecting mirror whose thickness is larger than 1.5 mm.

4. The microscope apparatus according to claim 1, wherein the reflecting member is a reflecting prism.

5. A microscope apparatus comprising:
a spatial modulator that receives an irradiation light beam to form diffracted light beams in a first mode;
an objective optical system that, in the first mode, causes the diffracted light beams to interfere with each other on a sample to form an interference fringe, the objective optical system forming an image of the sample being modulated by the interference fringe on a surface of the spatial modulator;
a first image pickup means; and
a first relay optical system that forms an image of the sample being re-modulated by the surface of the spatial modulator on an image plane of the first image pickup means,
wherein the spatial modulator is able to be, in the first mode, inserted in and, in a second mode, removed from an optical path, and
in the second mode, a light separation means and, in the first mode, a reflecting member is disposed in the objective optical system, each being able to be selectively inserted in and removed from the optical path,
the spatial modulator being removed from the optical path, in the second mode, when the light separation means is inserted in the optical path, and
the spatial modulator being inserted in the optical path, in the first mode, when the reflecting member is inserted in the optical path.

6. The microscope apparatus according to claim 5, wherein, in the first mode, a light from the sample forms an image on the surface of the spatial modulator when the reflecting member is inserted in the optical path, and in the second mode, light from the sample forms an image on an image plane of a second image pickup means that is different from the first image pickup means through a second relay optical system that is different from the first relay optical system when the light separation means is inserted in the optical path.

7. The microscope apparatus according to claim 5, wherein the reflecting member is a reflecting mirror whose thickness is larger than 1.5 mm.

8. The microscope apparatus according to claim 5, wherein the reflecting member is a reflecting prism.

9. A microscope apparatus comprising:
a light source that is decentered from an optical axis;
a spatial modulator that receives an irradiation light beam from the light source to form diffracted light beams;
an objective optical system that causes the diffracted light beams to interfere with each other on a sample to form an interference fringe, the objective optical system forming an image of the sample being modulated by the interference fringe on a surface of the spatial modulator;
image pickup means; and
a relay optical system that forms an image of the sample being re-modulated by the surface of the spatial modulator on an image plane of the image pickup means,
wherein the spatial modulator is able to be inserted in and removed from an optical path.

* * * * *